United States Patent
Das et al.

(10) Patent No.: US 6,190,037 B1
(45) Date of Patent: Feb. 20, 2001

(54) NON-INTRUSIVE, ON-THE-FLY (OTF) TEMPERATURE MEASUREMENT AND MONITORING SYSTEM

(75) Inventors: Ashok Das; Nety Krishna, both of Sunnyvale; Marc Schweitzer, San Jose; Nalin Patadia, Campbell; Wei Yang, Fremont; Umesh Kelkar, Sunnyvale; Vijay Parkhe, Sunnyvale; Scot Petitt, Sunnyvale; Nitin Khurana, Santa Clara, all of CA (US)

(73) Assignee: Applied Materials, Inc., Santa Clara, CA (US)

( * ) Notice: Under 35 U.S.C. 154(b), the term of this patent shall be extended for 0 days.

(21) Appl. No.: 09/253,220

(22) Filed: Feb. 19, 1999

(51) Int. Cl.$^7$ ...................................................... G01J 5/00
(52) U.S. Cl. ..................... 374/121; 374/124; 374/141; 374/1
(58) Field of Search ..................................... 374/121, 124, 374/141, 1, 128, 126, 129

(56) References Cited

U.S. PATENT DOCUMENTS

| | | | |
|---|---|---|---|
| 4,819,167 | 4/1989 | Cheng et al. | 364/167.01 |
| 4,955,979 | * 9/1990 | Denayrolles et al. | 374/131 |
| 4,956,538 | 9/1990 | Moslehi | 374/20 |
| 4,969,748 | * 11/1990 | Crowley et al. | 374/1 |
| 4,984,902 | 1/1991 | Crowley et al. | 374/1 |
| 5,362,969 | 11/1994 | Glenn | 250/561 |
| 5,483,138 | 1/1996 | Shmookler et al. | 318/568.16 |
| 5,536,359 | 7/1996 | Kawada et al. | 156/626.1 |
| 5,563,798 | 10/1996 | Berken et al. | 364/478.06 |
| 5,696,703 | * 12/1997 | Barber | 374/128 |
| 5,706,201 | 1/1998 | Andrews | 364/468.15 |
| 5,713,666 | * 2/1998 | Seelin et al. | 374/126 |
| 5,738,440 | 4/1998 | O'Neill et al. | 374/128 |
| 5,822,213 | 10/1998 | Huynh | 364/478.01 |
| 5,844,683 | 12/1998 | Pavloski et al. | 356/399 |
| 5,893,643 | * 4/1999 | Kumar et al. | 374/121 |

* cited by examiner

*Primary Examiner*—Diego Gutierrez
*Assistant Examiner*—Yaritza Guadalupe
(74) *Attorney, Agent, or Firm*—Thomason, Moser & Patterson, LLP

(57) ABSTRACT

The present invention provides an apparatus and method for measuring the temperature of a moving radiant object. A probe, such as a pyrometer, is disposed in an opening of a vacuum chamber adjacent a radiation transparent window. The probe defines an optical path which intercepts the radiant object entering or exiting a processing chamber. The radiant object is moved through the optical path and emits electromagnetic waves. The electromagnetic waves are collected by the probe and transmitted to a signal processing unit where the waves are detected and converted to a temperature reading. If desired, the accumulated data may then be used to generate a cooling curve representing the thermal effects experienced by the radiant object. Extrapolation or correlation methods may be used to extend the cooling curve to points in time prior to or after the data collected by the probe.

27 Claims, 7 Drawing Sheets

NON-INTRUSIVE, ON-THE-FLY (OTF) TEMPERATURE MEASUREMENT AND MONITORING SYSTEM

BACKGROUND OF THE INVENTION

1. Field of the Invention

The present invention relates to semiconductor processing and in particular to a method and apparatus for temperature measurement and adjustment of an object using infrared pyrometry.

2. Background of the Related Art

In semiconductor manufacturing, substrate temperature is a critical process parameter. Throughout the various stages of substrate handling and processing, the substrate temperature varies significantly. Measuring the substrate temperature at a given time allows valuable data to be accumulated and analyzed. Feedback can then be used to adjust process parameters or determine the viability of certain process materials.

A preferred temperature measuring device must be reliable and non-intrusive and capable of accurate, reproducible, and process-independent measurements. Additionally, the device must not interfere with the throughput of the processing system, i.e., the productivity of the system. Throughput is related to the idle time during which substrates are not being processed. Therefore, a preferred device does not contribute significantly to the idle time of the system.

A typical non-contact temperature measuring device is a pyrometer capable of detecting radiation from a heated surface. A pyrometer works by measuring the amount of radiation emitted in a certain spectral regime, such as infrared, from the object to be measured. The temperature can then be determined according to known formulas such as Planck's Radiation Law.

Current methods and apparatus using pyrometers are typically capable of in-situ measurement. In-situ systems position the pyrometer with a line-of-sight to the substrate during processing such that the pyrometer receives electromagnetic waves directly from the substrate. Light pipe probes are sometimes used in tandem with a pyrometer to direct the propagating waves to the pyrometer. This allows real-time temperature readings throughout the processing period. Examples of such arrangements are described in U.S. Pat. No. 5,738,440, assigned to International Business Machines, Inc., and U.S. Pat. No. 4,956,538, assigned to Texas Instruments, Inc.

However, in-situ systems are difficult and expensive to implement on existing chambers. For example, deposition chambers equipped with pedestals for supporting the substrates, must be modified to receive optical devices, such as light pipe probes, from the backside of the pedestal. While such modifications are often made for purposes of research and development, it is expensive and impractical for large-scale production.

Additionally, some chambers, such as chemical vapor deposition (CVD) chambers, will not support any form of intrusive optical devices. CVD involves depositing a coating on a substrate by introducing chemical fluids into the chamber and bringing them into contact with the substrate. Intrusive devices, such as light pipe probes, require an "eye," or light inlet, to receive the electromagnetic waves. Over time, the chemical precursors are deposited on the eye and obstruct wave propagation therethrough and prevent accurate temperature measurements.

The disadvantages of in-situ temperature sensing technology has provided impetus for alternative ex-situ systems. In one such system used in processing systems, substrate temperatures are measured in cooldown chambers after processing. The cooldown chambers are fitted with light pipes to receive thermal radiation and determine a substrate temperature. After processing, a transfer robot retrieves the substrate from the process chamber and shuttles it to the cooldown chamber where it is placed on a support member in view of the light pipe. Once a temperature reading is taken, the end-of-process temperature can be determined by extrapolation.

However, such an arrangement suffers not only from the disadvantages involved in retrofitting existing equipment but also from its generation of poor data. During the transfer from the process chamber to the cooldown chamber, heated substrates experience substantial and rapid cooling. The lag between the end-of-process time and the temperature reading in the cooldown chamber leads to increased error in the estimation of the end-of-process temperature by extrapolation.

A number of requirements have limited the flexibility in design changes to temperature measuring devices. In general, the need for high throughput requires the measurement to be simultaneous with other necessary processing events such as annealing or cooling. Additionally, both in-situ and ex-situ systems currently known in the industry require the substrate to be stationary during temperature measurement. As a consequence, temperature measurement devices are commonly located in cooldown chambers or other chambers not involving deposition where substrates reside for a period of time as part of the overall processing sequence. Thus, a preferred device must yield superior data while minimizing detrimental effects on throughput.

Therefore, there remains a need for ex-situ optical detection equipment which is reliable, process-independent, non-invasive, and easily implemented on existing fabrication systems. In addition, the ex-situ device must be able to accumulate accurate data while maximizing productivity.

SUMMARY OF THE INVENTION

The present invention generally provides an apparatus for measuring the temperature of a radiant object. A probe is mounted in a first chamber and has a line-of-sight to a second chamber aperture. The probe defines an optical path incident on a surface of the radiant object. Electromagnetic waves emitted by the radiant object are collected by the probe and are converted into a temperature reading. In one embodiment, the first chamber may be a transfer chamber while the second chamber may be an adjacent process chamber.

In another aspect of the present invention, a probe is mounted on a chamber and defines an optical path which intercepts a moving radiant object. The probe collects electromagnetic waves propagating from the radiant object as it passes through the optical path. The electromagnetic waves are transmitted over an optical cable to a signal converter which converts the waves to an electrical signal representing a temperature of the radiant object. A microprocessor/controller coupled to the signal converter receives and processes the electrical signal. In one embodiment the probe is a pyrometer.

In yet another aspect of the present invention, two or more probes are mounted to a chamber and define two or more optical paths. Each optical path intercepts a moving radiant object at a defined position. The probes collect electromagnetic waves emitted by the substrate and transmit a corresponding signal to a signal processing unit. The signal processing unit receives and processes the signal.

In still another aspect, the present invention provides a method of taking a temperature measurement of a moving object. The object is moved into an optical path of a probe and emits radiation. The radiation is collected by the probe and then transmitted to a signal processing unit. The processing unit then converts the radiation measurement into a temperature reading.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENT

The numerals in the subsequent description correspond to the accompanying figures. For ease of understanding, identical or similar features are identified by the same numerals in each of the figures.

The present invention is an apparatus and method for measuring an object's temperature on-the-fly (OTF), ie., while the object is in motion. The apparatus comprises a probe, such as a pyrometer, coupled to a signal processing unit for measuring the temperature of a thermally agitated object, such as semiconductor substrate. In a preferred embodiment, the probe is positioned on a transfer chamber with a line-of-site to the substrate during transfer to and from a processing chamber. Radiation emitted by the substrate before and after processing is received by the probe and routed to the signal processing unit where it is converted from an optical signal to a corresponding electrical signal representing a temperature. The electrical signal may be stored in a data storage device, such as a computer memory, and also viewed on a display. Feedback may then be generated and used to adjust the operating parameters of the chamber such as gas flow rates, heater temperature, pressure, etc., to achieve or maintain desired levels.

Figure 1:
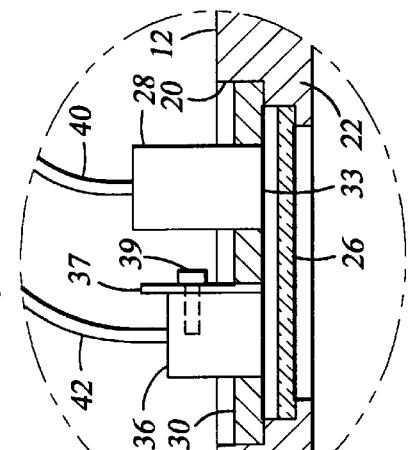
FIG. 1 is a cross sectional side view of a processing system.

FIG. 1 is a cross section of a processing system 10 comprising a transfer chamber 12 and a process chamber 14 mounted thereon. An extendable blade 16 is actuated in rotational and radial directions by a centrally located transfer robot 18 to shuttle substrates between various positions. The transfer chamber 12 and process chamber 14 may comprise components of a cluster tool such as the one shown in FIG. 2 and described in detail below.

An opening 20 formed in a transfer chamber wall 22 proximate the process chamber 14 provides a line-of-sight to a slit valve aperture 24 of the process chamber 14. The opening may be a viewport such as those found on common cluster tools. A window 26 disposed within the opening 20 hermetically seals the transfer chamber 12 from atmospheric conditions. The window 26 preferably comprises sapphire or quartz or other material which is transparent to infrared light. While the present invention may be operated in the 0.9–10 $\mu\lambda$ regime, i.e., within the infrared spectral region, preferably operation occurs between 0.9–4.0 $\mu\lambda$ for which sapphire and quartz exhibit excellent efficiency.

A probe 28 is disposed within the opening 20 by means of any conventional mounting devices, an example of which is shown in FIG. 1. An adapter 30 having substantially the same geometric shape as the opening 20 is shown disposed in the opening 20 adjacent the window 26. The probe 28 is secured in a threaded hole formed in the adapter 30 such that radiation from inside the transfer chamber 12 may be received at an inlet end 33 of the probe 28. The adapter 30 may be made of any opaque material such as anodized aluminum. The opacity of the adapter 30 prevents radiation from external sources from propagating through the opening and interfering with the operation of the present invention.

The probe 28 may be any common device capable of gathering infrared light such as a pyrometer available from Luxtron Corp., of Santa Clara, Calif. The probe 28 is positioned to define an optical path 32 through the window 26 which intercepts a moving radiant object, such as a substrate 34, before or after processing. While the probe 28 may be positioned at any location within the transfer chamber 12 having a line-of-sight to the threshold of the slit valve aperture 24, a preferred position, as shown in FIG. 1, is above the slit valve opening or as close thereto as possible. The optical path 32 intercepts the substrate 34 at a minimal distance from the opening 20 so that a temperature reading of a processed substrate exiting the process chamber 14 may be made before substantial cooling occurs in the transfer chamber 12. Thus, the temperature reading of a processed substrate according to the present invention approximates the temperature of the substrate immediately prior to its entrance and/or emergence from the process chamber 14 where the substrate is not in view of the probe 28. Further, in order to minimize the contribution of ambient noise, the preferred position minimizes the distance between the probe 28 and the slit valve aperture 24.

Additionally, in the preferred position shown in FIG. 1, the probe 28 is directly above the substrate as it enters or exits the transfer chamber 12. Thus, optical path 32 is normal to the substrate 34 while temperature readings are made. Although the probe 28 may be at any location having a line-of-sight to the slit valve aperture 24 the substrate emissivity changes with the angle between the optical path and the substrate. Therefore, emissivity, a user selected variable necessary to determine the substrate temperature, must be calculated according to a particular geometric configuration of the present invention. Emissivity, and its application in the present invention, is discussed in greater detail below.

A substrate detecting sensor 36 is also disposed within the opening 20 adjacent to the probe 28 to detect the presence of a substrate entering or exiting the slit valve aperture 24 of the process chamber 14. The substrate detecting sensor 36 may be mounted to the adapter 30 by any conventional fasteners such as the bracket 37 and screws 39 shown in FIG. 1. The bracket 37, in turn, is mounted to the adapter 30 and is of a length slightly greater than the diameter of the adapter 30. Each end of the bracket is received by notches (not shown) formed in the opening 20. Thus, the bracket 37 provides means for mounting the substrate detecting sensor 36 as well as stabilizing the adapter in the opening 20.

Optionally, the function of substrate detecting sensor 36 may be performed by the probe 28. In such an embodiment, radiation propagating from the surface of the substrate is received by the probe and transmitted to a signal processing unit such as the one described in detail below. The radiation signal indicates the presence of the substrate and prompts the signal processing unit to trigger an appropriate event sequence, e.g., the temperature measuring sequence.

The probe 28 and the substrate detecting sensor 36 are both coupled to a signal processing unit 38. The type of cables used to couple each device is determined by the signal to be supported therethrough. Thus, an optical cable 40 couples the probe 28 to the signal processing unit 38 to deliver an optical signal, while an output cable 42, couples the substrate detecting sensor 36 to the signal processing unit 38 to deliver an electrical signal.

The signal processing unit 38 is shown in FIG. 1 as comprising a signal detector/converter 44 and a microprocessor/controller 46 both of which are available through commercial sources. The signal detector/converter 44 and microprocessor/controller are coupled together by a cable 45 such as a RS-232 cable. The signal detector/converter 44 is preferably an optical fiber thermometer (OFT), such as an Indium Gallium Arsenide (InGaAs) thermometer, calibrated at 0.9 $\mu\lambda$ to 3.0 $\mu\lambda$. Although other OFTs may be used, the InGaAs OFT is particularly useful for low temperature readings. However, the OFT is ultimately selected according to the particular substrate composition because some materials are transparent in the spectral operating regime of InGaAs OFTs, such as silicon and oxides which are transparent at wavelengths greater than 1 $\mu\lambda$. Optical fiber thermometers usable with the present invention are available from suppliers such as Luxtron, Corp. and Sekidenko.

The microprocessor/controller 46 is also shown coupled to the process system 10 to monitor and control the processing events therein. This arrangement allows information gathered from the various peripheral devices, i.e., probe 28, substrate detecting sensor 36, signal detector/converter 44, etc., to be used in changing operating parameters. Alternatively, multiple microprocessor/controllers may be individually connected to the peripheral devices. In the latter arrangement, the microprocessors/controllers could be linked to one another by input/output lines to allow for transmission of feedback. The details of the signal processing unit 38 are described in more detail below.

Process chamber 14 is a simplified schematic of a typical physical vapor deposition (PVD) chamber. Generally, the PVD chamber 14 comprises a processing region 48 and a movable pedestal 50 to support a substrate during processing. The pedestal 50 may include a heater and/or electrostatic chuck and is actuated by a motor 52 located outside of the chamber 14. Lift pins 54 are secured to an elevator plate 56 and vertically moved by an actuator 58 to lift a substrate from and onto the blade 16. A target 62 is disposed at an upper end of the chamber 14 and comprises a material to be deposited during processing. For simplification, other common components such as induction coils, exhaust channels, etc., are not shown.

The present invention is not limited to any particular chamber and chamber 14 is merely illustrative of one possible configuration. Other process chambers may include chemical vapor deposition chambers, ion implantation chambers, ion metal plasma chambers, and other chambers where temperature readings of a substrate are needed.

Figure 2:
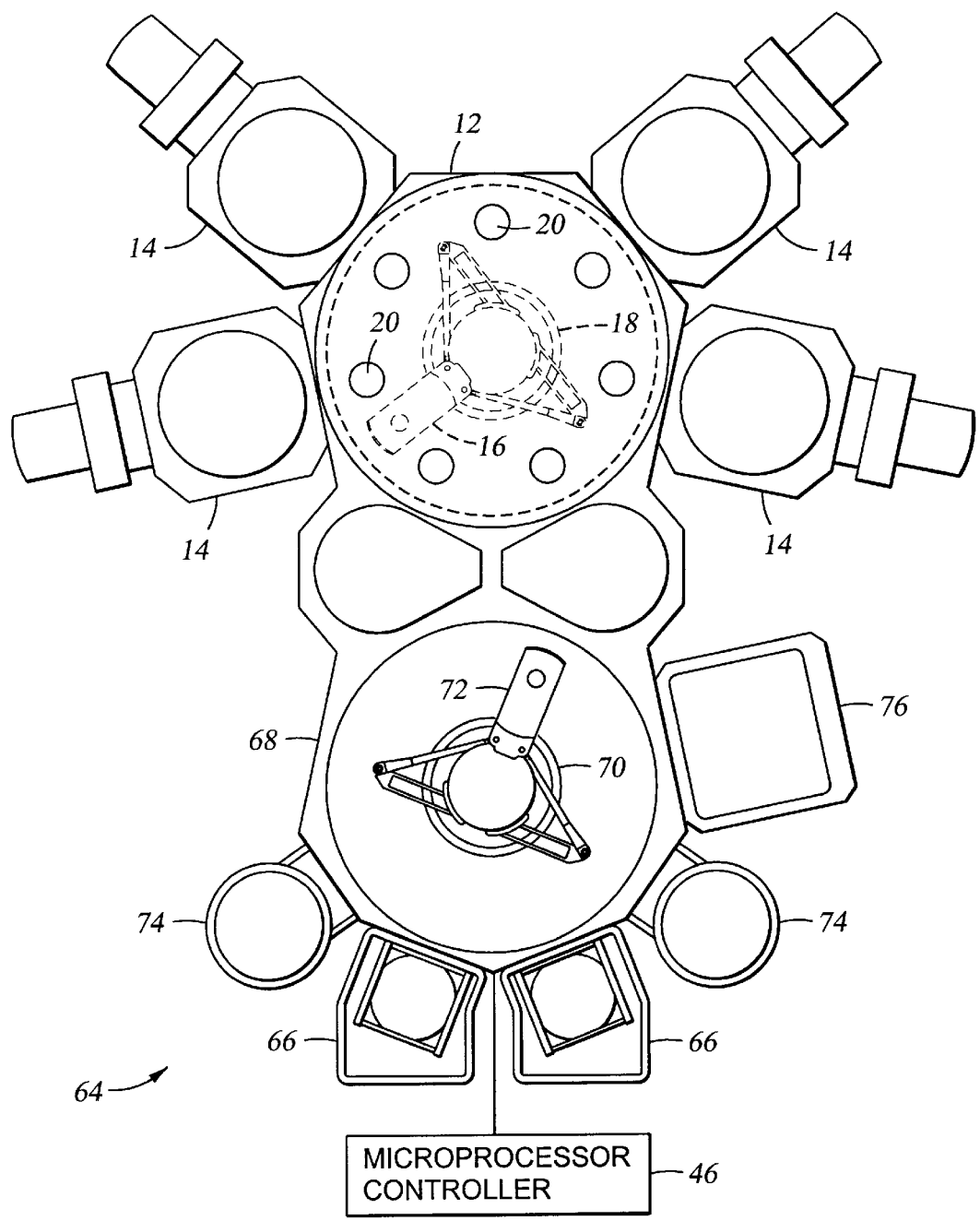
FIG. 2 is a top view of a typical cluster tool equipped with the present invention.

The transfer chamber 12 and the process chamber 14 may each be part of a larger unit commonly known as a cluster tool. FIG. 2 is a plan view of a typical cluster tool 64 for semiconductor processing wherein the present invention may be used to advantage. Two such platforms are the Centura® and the Endura® both available from Applied Materials, Inc., of Santa Clara, Calif. The details of one staged-vacuum substrate processing system is disclosed in U.S. Pat. No. 5,186,718, entitled "Staged-Vacuum Wafer Processing System and Method," Tepman et al., issued on Feb. 16, 1993, which is incorporated herein by reference. The exact arrangement and combination of chambers may be altered for purposes of performing specific steps of a fabrication process.

In accordance with the present invention, the cluster tool 64 is preferably equipped with a microprocessor controller 46 programmed to carry out the various processing methods performed in the cluster tool 64. The cluster tool 64 generally comprises a plurality of chambers and robots. Cassette loadlocks 66 disposed at a front end of the cluster tool 64 provide a first vacuum interface between a front-end environment and a buffer chamber 68. A robot 70 having a blade 72 transfers the substrates from the cassette loadlocks 66 through the buffer chamber 68 to a degas/substrate orientation chamber 74 and then to a pre-clean chamber 76. The robot 64 then transfers the substrate to robot 18 located in the transfer chamber 12. Robot 18 positions the substrate in one of the various processing chambers 14 mounted to the transfer chamber 12 for deposition of a film layer over the substrate. The process chambers 14 may perform any number of processes such as physical vapor deposition, chemical vapor deposition, etch, and the like.

A number of viewports 20 (shown also in FIG. 1) provide visual access into the transfer chamber 12. The cluster tool 64 is easily adapted to include the present invention by removing the Pyrex™ windows from the viewports 20 and replacing them with an appropriate infrared transparent material such as quartz or sapphire as described above. Alternatively, the Pyrex™ windows may be left in place and the detection equipment of the present invention may be calibrated according to the transmission capacity of Pyrex™. The probe 28 and substrate sensor 36 of the present invention may then be secured in the viewports 20 by means of the adapter 30 or any other conventional fastening methods or mechanisms. The probe 28 and the substrate detecting sensor 36 are then coupled to the signal processing unit 38. In this manner, a separate probe 28 and substrate sensor 36 may be positioned in one or more of the viewports 20. Preferably, each viewport 20 is equipped with a probe 28 and substrate sensor 36 so that substrates entering and exiting each chamber may be monitored.

The foregoing description for positioning the probe 28 and substrate sensor 36 is merely illustrative and other methods may be used. For instance, although the preferred embodiment provides the probe 28 and the substrate sensor 36 exterior to the transfer chamber 12, both components may be positioned inside the transfer chamber 12 and therefore under vacuum condition. Conventional sealing methods may be used to seal the transfer chamber body outlets provided for the cables 40, 42. Other embodiments will be recognized by those skilled in the art.

Figure 3:
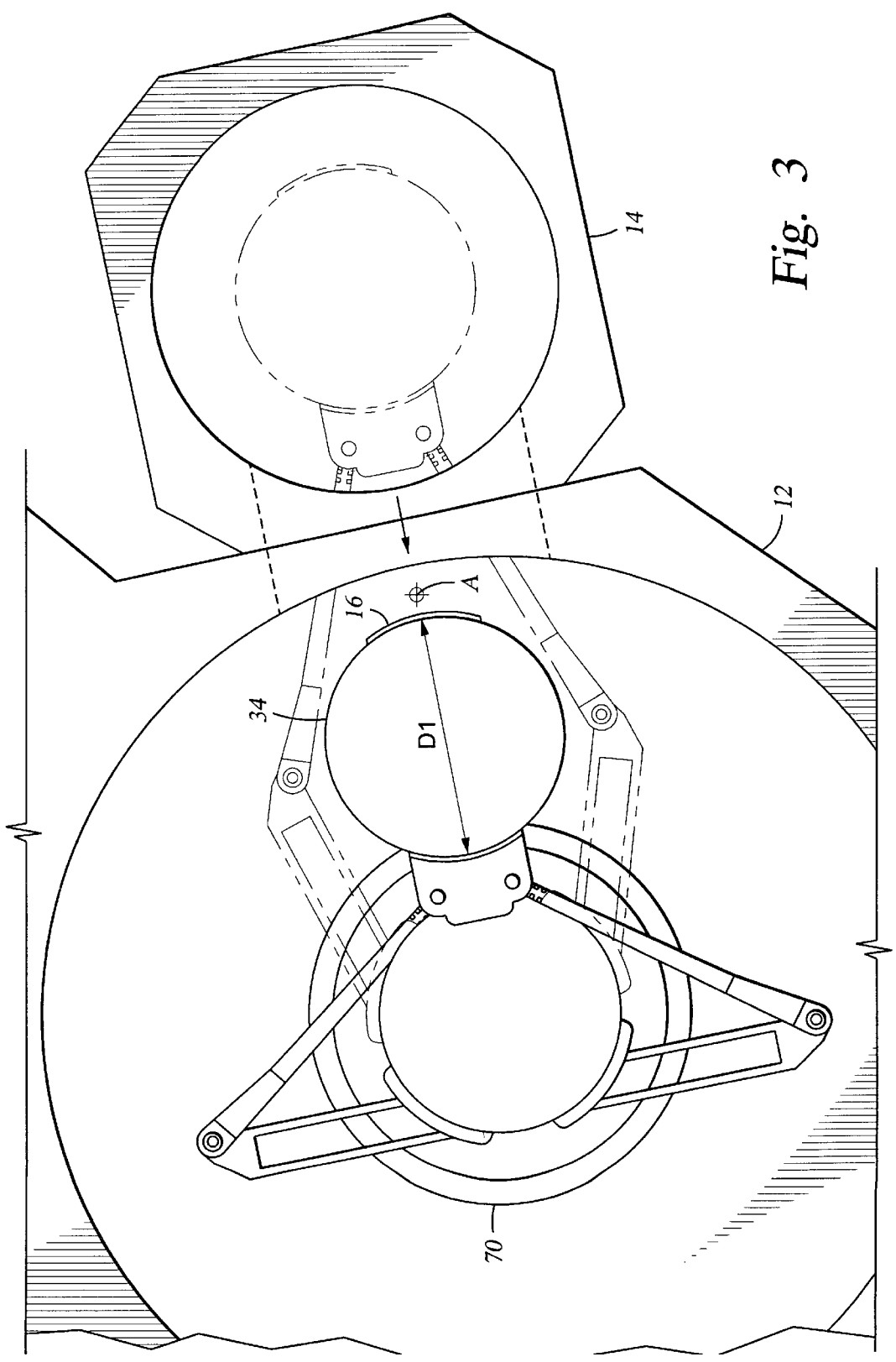
FIG. 3 is a top view of the transfer chamber of FIG. 2 showing one embodiment of the present invention.

Referring now to FIGS. 1 and 3, the operation of the present invention will be discussed. While temperature readings of a substrate may be taken prior to its introduction into the process chamber 14 and processing therein, the following description refers to post-processing measurements.

Upon completion of processing in the process chamber 14, the process chamber 14 is pumped up to a pressure substantially equal to that of the transfer chamber 12. The lift pins 54 then raise the substrate 34 from the upper surface of the pedestal 50 and the slit valve aperture 24 is opened. The robot blade 16 is then extended into the process chamber 14 and the substrate 34 is lowered onto the blade 16. As the blade 16 is retracted from the process chamber 14 into the transfer chamber 12 along a transfer plane 35, the substrate 34 disposed on the blade 16 intercepts the optical path 32 at point A as shown in FIG. 3. Successive temperature measurements are taken across a first diameter, D1, of the substrate surface. The blade 16 then rotates to shuttle the substrate 34 to another area of the transfer chamber 12 such as another process chamber.

The radiation collected by the probe 28 is transferred to the signal detector/converter 44 in the form of an optical signal via the optic cable 40. The signal detector/converter 44 then performs a series of tasks on the optical signal. Initially, the signal detector/converter 44 filters the optical signal according to the pre-calibrated operating regime, 0.9 $\mu\lambda$ to 1 0 $\mu\lambda$ for the present example. Subsequently, the filtered optical signal is converted into an electrical signal which is then transmitted to the microprocessor/controller 46 via cable 45. The electrical signal corresponds to a temperature which is adjusted according to user inputted emissivity values. A cooling curve is then generated using the adjusted temperature measurements. In order to reflect the cooling sustained in the process chamber, the resulting cooling curve may be extrapolated to the end-of-processing time. One possible algorithm comprising the steps involved in accumulating temperature data and extrapolation is described below with reference to FIGS. 7 and 8.

Figure 4:
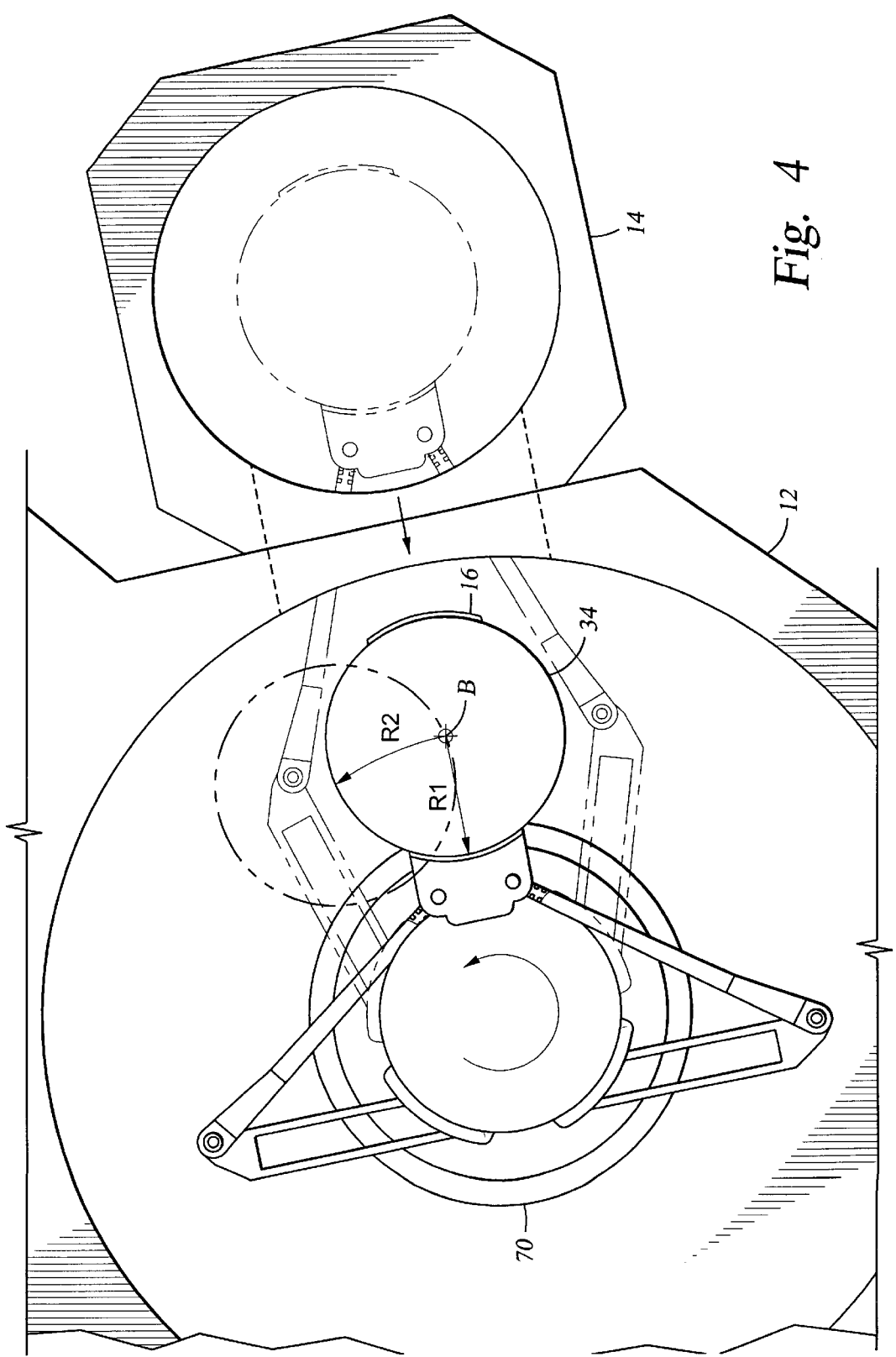
FIG. 4 is a top view of the transfer chamber of FIG. 2 showing another embodiment of the present invention.

While a preferred position of the probe 28 minimizes the distance traveled by the substrate before a first temperature reading is taken, the positioning may be varied according to a particular application. Thus, in an alternative embodiment, an optical path intercepts the substrate at point B, as shown in FIG. 4. Point B is positioned such that the substrate is moved through the optical path in a first direction along a radius R1 and then in a second direction along a rotational path R2. The first direction is radial, i.e., during retraction of the blade 16 along the transfer plane 35, while the second direction is angular, i.e., during rotation of the blade 16. This configuration is advantageous where temperature uniformity across two substantially orthogonal paths, R1 and R2, is being determined. R2 is shown having a curvature due to the rotation of the robot 18 on a central axis.

Figure 5:
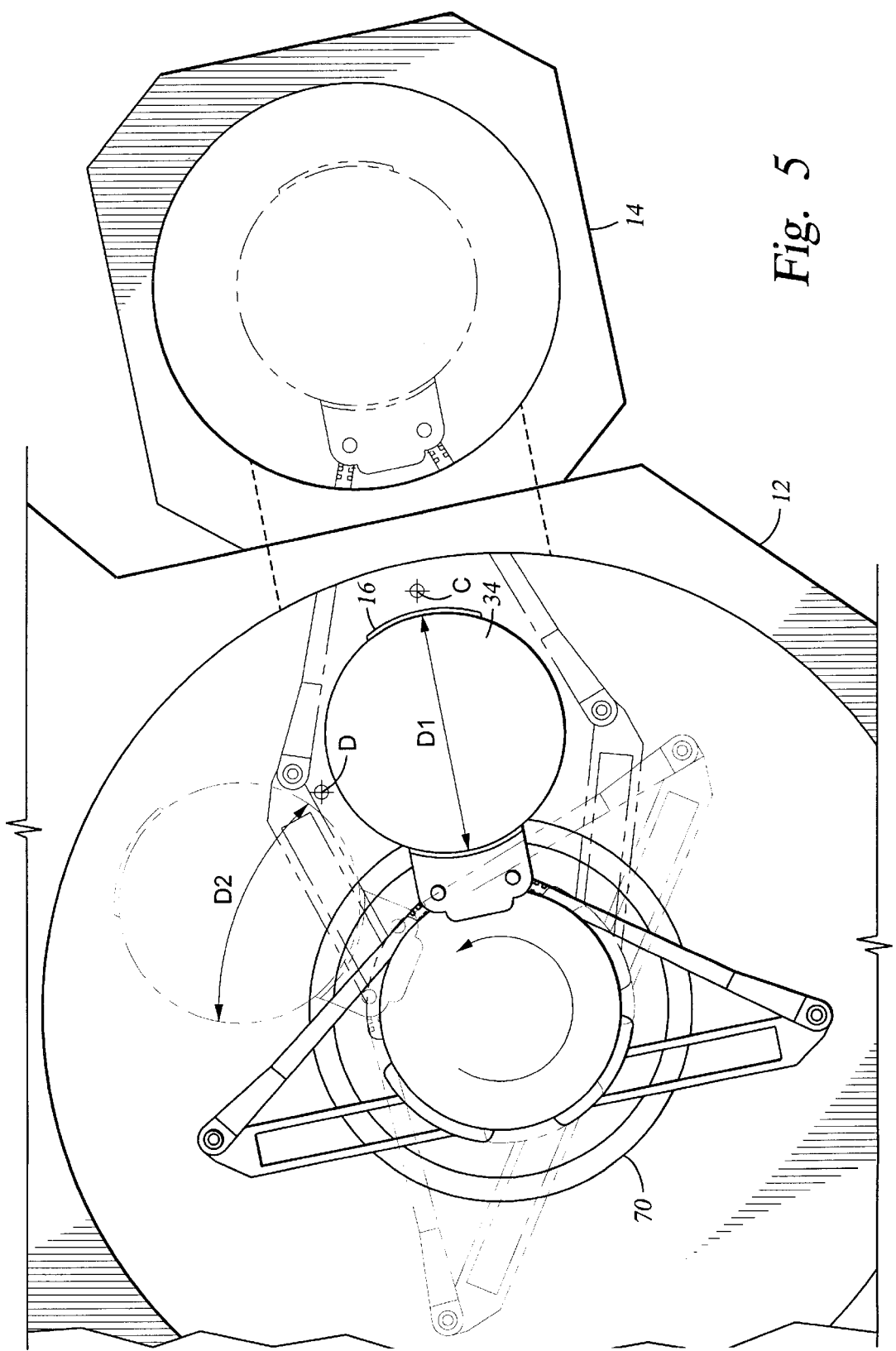
FIG. 5 is a top view of the transfer chamber of FIG. 2 showing another embodiment of the present invention.

In an alternative embodiment, multiple probes may be used. For example, two probes may be used to accumulate data on temperature uniformity across the area of a substrate. A first probe may be mounted directly above the threshold to the process chamber and with an optical path intercepting a substrate edge as it emerges from the chamber (such as probe 28 in FIG. 1). A second probe may then be positioned to define a second optical path intercepting a substrate a greater distance from the process chamber. This configuration allows the first probe to collect data from the substrate at its highest temperature after exiting the process chamber while allowing the second probe to collect additional data later in time and/or across another portion of the substrate. Thus, while the first probe provides temperature readings across the diameter of the substrate in one direction (from the leading substrate edge to the other side as it emerges from the process chamber), the second probe may be positioned to collect data across the substrate in a second direction. For example, FIG. 5 shows two points of incidence, C and D, for two optical paths of the first and second probes, respectfully (the probes are not shown). Thus, point C is positioned to collect temperature readings across a first diameter, D1, and point D is positioned to collect temperature readings across a second diameter, D2. The accumulated data can then be used to generate a cooling curve as well as determine temperature uniformity across the surface of the substrate. A person skilled in the art will recognize other possible embodiments.

Figure 6:
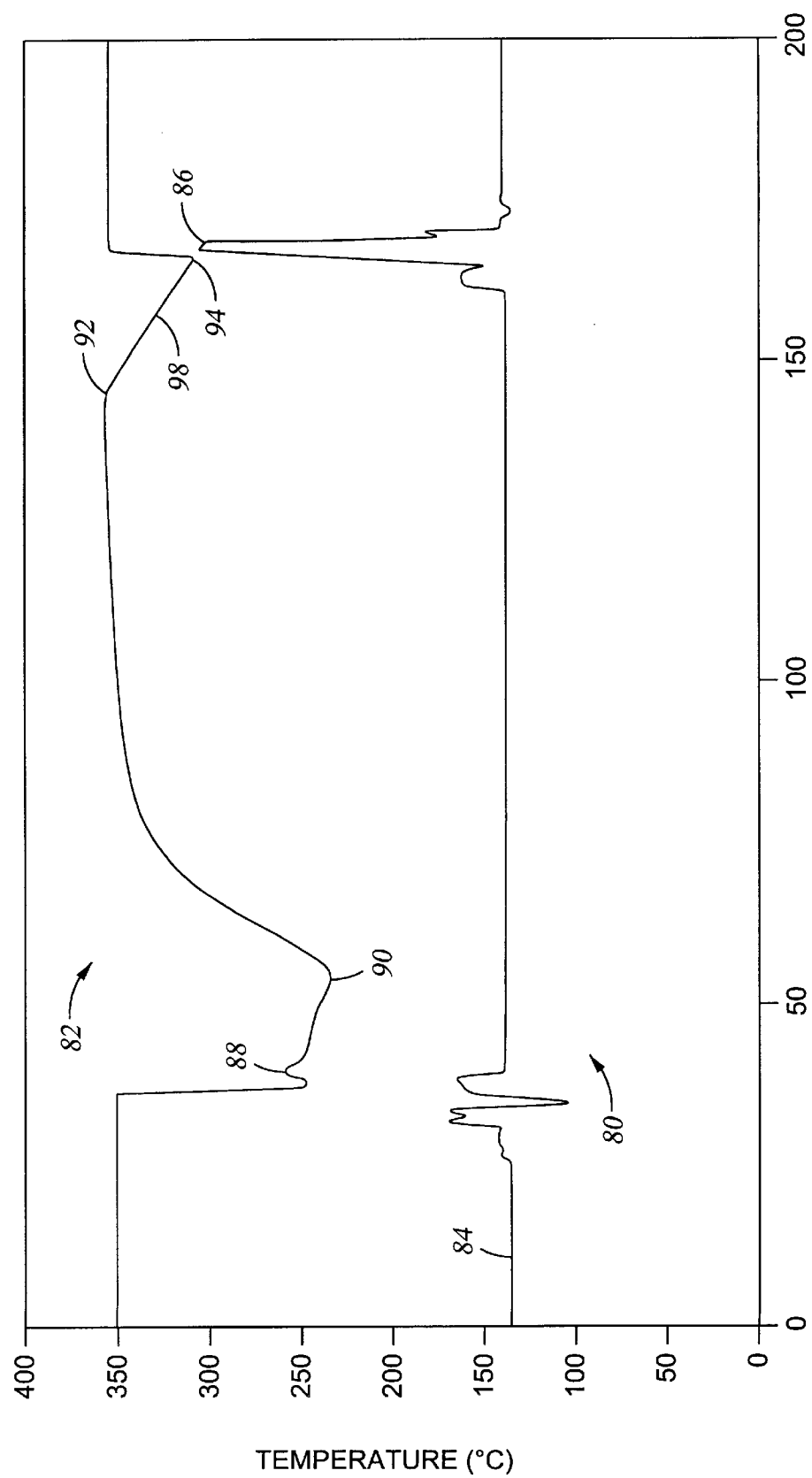
FIG. 6 is a graphical comparison of cooling curves using an in-situ probe and the ex-situ apparatus of the present invention.

FIG. 6 is a graphical representation of an ex-situ curve 80 based on data collected according to the present invention and an in-situ curve 82 generated using a typical in-situ sensor that was retrofitted to the process chamber. The in-situ curve 82 plots the temperature of the substrate in the processing chamber prior to coming in view of the pyrometer. The in-situ curve 82 shows the spectrum of substrate temperatures from the beginning of processing to the time the substrate exits the chamber. The in-situ curve 82 generally comprises a substrate entrance reading 88, a process initiation reading 90, a process end-point reading 92, and a substrate exit reading 94. The portion between the process end-point reading 92 and the substrate exit reading 94 defines an in-situ cooling curve 98 which represents the decreasing temperature detected as the cooling substrate exists the process chamber.

Regarding the ex-situ curve 80, a single pyrometer was mounted in a viewport of a cluster tool above the slit valve aperture to a process chamber in a configuration similar to that shown in FIG. 1. The ex-situ curve 80 was then generated by taking multiple successive temperature readings from a highly doped substrate exiting the process chamber after undergoing processing. The readings were taken at a rate of about four (4) per second by a Luxtron, Corp. pyrometer. Radiation collected by the pyrometer was channeled to a factory calibrated detector/converter at which point the radiation signal was converted to a temperature. A user-selected emissivity value was used to adjust the temperature.

Generally, the ex-situ curve 80 comprises two components, a baseline portion 84 and an ex-situ cooling curve 86. The baseline portion 84 (shown at about 130–140° C.) represents the noise detected by the pyrometer emanating from peripheral radiant sources, such as degas lamps and ion gauges, while the ex-situ cooling curve 86 represents the cooling experienced by the substrate after exiting the chamber. The peak of the ex-situ cooling curve 86 indicates the first temperature measurement taken by the pyrometer. The aggregate temperature readings define a substantially linear cooling curve until the last reading at which point ex-situ cooling curve 86 is terminated and the ex-situ curve 80 then drops off dramatically. This sudden change in the slope of the ex-situ curve 80 indicates that the substrate has moved out of the optical path of the pyrometer. The ex-situ curve 80 then stabilizes at the baseline portion 84.

Comparison of the two curves 80, 82 indicates that the pyrometer should preferably be placed in close proximity to the threshold of the process chamber. The ex-situ cooling curve 86 is relatively steep indicating a fast cooling rate. Positioning the pyrometer such that the optical path intercepts the substrate immediately as it exits the process chamber assures a better approximation of the substrate temperature immediately prior to exiting the process chamber. As can be seen from FIG. 6, the first temperature reading by the pyrometer, indicated at the peak of the ex-situ cooling curve 86, is approximately equal to the substrate exit reading 94 on the in-situ curve 82. This reflects a desired result wherein the cooling experienced by the substrate while being transferred from the process chamber into the view of the pyrometer is minimal. Consequently, data produced using the ex-situ cooling curve 86 accurately reflects the actual substrate temperature while residing in the process chamber immediately prior to its removal from the chamber.

Figure 7:
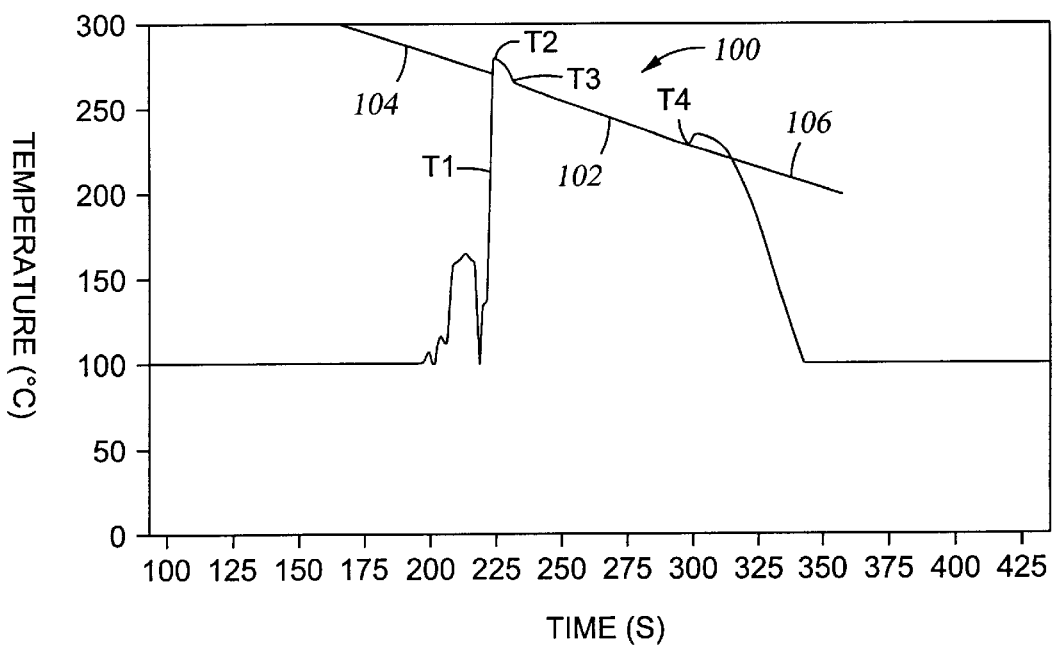
FIG. 7 is a graphical representation of a cooling curve developed using the present invention.

Further, the slope of the ex-situ cooling curve 86 is substantially equal to that of the in-situ cooling curve 98. Thus, the ex-situ cooling curve 86 is essentially a continuation of a substrate cooling curve initiated in the process chamber. This property of continuity is used to generate a complete curve based only on the partial information provided by the ex-situ cooling curve 86. This may be accomplished, for example, by extrapolation or by correlation with known temperature values which may be stored in and retrieved from a table. Thus, a complete cooling curve beginning at the process end-point can be generated based on the data provided by the present invention and by recording the elapsed time from the process endpoint to the first temperature measurement taken by the pyrometer. The elapsed time approximately represents the cooling time inside the process chamber. One example of a curve generated using extrapolation is shown in FIG. 7 and is discussed in detail below.

The signal processing unit

The present invention may be operated using a computer program product, comprising a program code, which can be run on a conventional computer system. In the embodiment shown in FIG. 1, the microprocessor/controller 46 monitors and controls all events in the processing system 10. In general, the microprocessor/controller 46 comprises one or more central processing units (CPU) connected to a memory system with peripheral control components, such as for example a 68400 microprocessor, commercially available from Synergy Microsystems, Calif. The computer program code can be written in any conventional computer readable programming language such as for example 68000 assembly language, C, C++, Pascal, or Java. Suitable program code is entered into a single file, or multiple files, using a conventional text editor, and stored or embodied in a computer usable medium, such as a memory system of the computer. If the entered code text is in a high level language, the code is compiled, and the resultant compiler code is then linked with an object code of precompiled windows library routines. To execute the linked compiled object code, the system user invokes the object code, causing the computer system to load the code in memory from which the CPU reads and executes the code to perform the tasks identified in the program.

For measuring substrate temperature according to the present invention, the computer program product preferably comprises a software package equipped with a graphical user interface (GUI) capable of recording substrate temperature data for multiple chambers. Data is displayed on a monitor in "Run Chart" format (e.g., time, chamber, temperature, substrate number, etc.) including chamber specific upper and lower user-controlled warning levels and specification limits. Each chamber has its own run chart. In order to minimize clutter on the monitor, the controls for each chamber can be hidden from view using a toggle function.

The software preferably allows for two modes of operation: engineering and operator modes. In the engineering mode, all data is recorded and displayed, while in operator mode an algorithm (described in greater detail below) is used to capture summary temperature data to be plotted. In both modes, the software records a substrate index number when it identifies the temperature profile arising from a targeted substrate. The substrate is considered targeted when the substrate is either entering or exiting a chamber, but not when the substrate is traveling between chambers. However, this embodiment is merely illustrative and the software may be programmed to target the substrate at any given time.

The temperature of the substrate in the chamber is estimated using the algorithm, discussed below, which extrapolates the temperature based on the measured cooling rate (e.g., the ex-situ cooling curve 86 of FIG. 6) and a user-selectable time factor (representing any point or range of time during the cooling inside the process chamber). The algorithm is preferably designed to be immune to the rapid temperature decrease of the substrate due to radiation loss when it exits a chamber, as well as the random and systematic noise due to substrate movement. Additionally, the temperature is adjusted for signal gains/losses due to hardware such as the pyrometer 28, signal detector/converter 44, optical cable 40, etc., and emissivity. Signal gains/losses are accounted for according to calibration values obtained from the respective hardware manufacturers. Because emissivity values can be determined according to the particular material of a radiant object and the geometric relation between the pyrometer and the substrate (described above), a table may be created for various materials. During operation, the appropriate emissivity value may be retrieved from the table and used to adjust the temperature reading. The adjusted temperature is compared with the user selected upper and lower warning and specification levels for each measurement. If the temperature falls outside these levels, the system operator is then notified via flashing error indicators on the screen.

Once the substrate temperature measurements are obtained, feedback may be generated to adjust the various processing parameters such as chamber pressure and temperature. The parameters may be entered manually or according to pre-established set-points retrieved from tables which are correlated to specific substrate temperatures.

The algorithm

As described above, the present invention collects various temperature data from multiple points on a moving substrate. The points of data are used to construct a cooling curve 100 such as the one shown in FIG. 7. However, because the substrate cooling begins in the process chamber where no temperature readings are taken, the first portion of the cooling curve 100 is constructed according to extrapolation or a correlation table. Thus, the cooling curve 100 generally comprises two components, the recorded curve 102, and the extrapolated curve 104. The following is an example of steps which may comprise an algorithm used to advantage in accumulating data to construct the cooling curve 100 according to the present invention. Temperature readings of a 200 mm highly doped silicon wafer were taken at a rate of approximately four (4) per second. The output was adjusted for emissivity and losses/gains due to hardware such as the window, cables, the pyrometer, etc. Reference is made to FIG. 7 as well as the steps of the flow chart in FIG. 8.

For a given substrate, the substrate temperature measurement is monitored according to successive time increments [n], where T[n] indicates the current temperature measurement. For each time increment, the temperature value T[n], an error value, E[n], and a difference value, D[n], are generated. E[n] is defined as the change in temperature between successive measurements, i.e., T[n]−T[n−1]. D[n] is defined as the difference in the error value between successive measurements, i.e., E[n]−E[n−1]. The data recording sequence is initiated when a user-defined threshold temperature, T1, is measured by the probe (step 110). Although the value assigned to T1 is dependent on the particular process, in general, T1 is greater than the base noise level received by the sensor and less than the expected temperature of a substrate exiting a chamber after processing. Preferably, two successive data readings are compared to T1 before proceeding. This comparison minimizes the possibility of a bad reading triggering the subsequent program steps.

Once step 110 is satisfied, the sequence is initiated. In step 112, the beginning of the down slope of the highest peak is detected. In general, this is done by determining whether the temperature of the substrate was decreasing at the previous time increment, i.e., whether E[n−1] is less than a negative number, T2, where T2 is negative to indicate a decreasing cooling curve slope. T2 is a user-selected quantity chosen to determine how quickly the cooling curve is dropping. Additionally, the current temperature change, E[n], is compared to E[n−1] to determine whether E[n−1] is less than E[n]. Where both conditions are satisfied, i.e., E[n−1]<T2 and E[n−1]<E[n], the sequence proceeds to step 114. Step 114 detects a point at which the cooling curve attains a substantially constant (i.e., unchanging) slope. This is determined by comparing the changes in successive error values. As described above, this variable is defined as D[n]. Where D[n] approaches zero, the successive temperature changes are equal, i.e., E[n]=E[n−1]. However, in practice a value, T3, slightly greater than zero is input by the user. For the cooling curve in FIG. 2, the value for T3 was 0.1. Where D[n]=T3, a constant slope is detected and the sequence proceeds to step 4.

In step 116 the data is accumulated and the end of the constant slope is detected. The end of the slope occurs at the time the substrate is moved out of view of the pyrometer. The end of the slope may be detected by comparing D[n] to a user selected value, T4. However, because the rate of cooling is now decreasing, i.e., the slope is becoming less negative, E[n] is <E[n−1] which results in D[n] being negative. Thus, step 116 may include the requirement that the absolute value of D[n] be greater than T4. Additionally, to compensate for slight variations in data readings due to noise, the value assigned to T4 is preferably greater than T3. For the cooling curve in FIG. 2, the value for T4 was 2.0. Having attained data points at the beginning of the slope (T3) and at the end of the slope (T4), the intervening data points are generated by interpolation. Because the substrate cooling rate is monitored only over a short time period, the cooling curve may be assumed to be linear resulting in the substantially linear recorded curve 102 of FIG. 7. Similarly, the recorded curve 102 may be extrapolated to a given point in time representing the cooling experienced by the substrate prior to coming in view of the pyrometer, i.e., while in the process chamber. This portion of the substrate's cooling is represented in FIG. 7 by the extrapolated curve 104. The range of the extrapolated curve 104 is defined by a recorded time from the process end-point to the first measurement taken by the pyrometer. The elapsed time may be recorded by the microprocessor/controller 46.

The remaining descending portion of the curve in FIG. 7 following T4 represents readings taken after the substrate is moved out of the optical path of the pyrometer. Therefore, the data points after T4 are generally immaterial and may be discarded. However, where desired, a second extrapolated curve 106 may be constructed according to the recorded curve 102. Such a curve 106 reflects the substrate's continued cooling. Alternatively, the second extrapolation curve may be generated from predetermined values stored in a table.

The foregoing is merely illustrative of one embodiment. Other designs and modifications may be made to the signal processing unit and algorithm without departing from the scope of the present invention. Thus, the algorithm may be adapted to different processing environments and cooling curves as well as made more robust to resist background noise.

While foregoing is directed to the preferred embodiment of the present invention, other and further embodiments of the invention may be devised without departing from the basic scope thereof, and the scope thereof is determined by the claims that follow.

What is claimed is:

1. An apparatus for measuring the temperature of an object, comprising:
    (a) a first vacuum chamber comprising an aperture for transfer of the object therethrough;
    (b) a second vacuum chamber comprising a radiation transparent window disposed in a port formed in the second vacuum chamber, wherein the second vacuum chamber is positioned adjacent to the first vacuum chamber and wherein the aperture provides communication between the first and second vacuum chambers;
    (c) a probe positioned in the port and proximate the aperture to receive thermal radiation from the object; and
    (d) a signal processing unit coupled to the probe.

2. The apparatus of claim 1, wherein the probe is a pyrometer.

3. The apparatus of claim 1, further comprising a robot disposed in the first vacuum chamber, wherein the robot comprises a movable blade for supporting the object and positioning the object in an optical path of the probe.

4. The apparatus of claim 1, wherein the aperture defines a transfer plane therethrough and wherein the probe defines an optical path intercepting the transfer plane.

5. The apparatus of claim 1, wherein the first vacuum chamber is selected from the group comprising a physical vapor deposition chamber, a chemical vapor deposition chamber, an etch chamber, and an ion metal plasma chamber.

6. The apparatus of claim 1, wherein the signal processing unit comprises:
    (i) a signal converter coupled to the probe to convert the optical signal into an electrical signal; and
    (ii) a microprocessor coupled to the signal converter to process the electrical signal and produce data therefrom.

7. The apparatus of claim 6, further comprising a memory coupled to the microprocessor, the memory comprising a computer usable medium comprising a computer readable program code for receiving the data and generating a cooling curve of the object therefrom.

8. The apparatus of claim 6, wherein the signal converter is an optical fiber thermometer.

9. The apparatus of claim 1, wherein the radiation transparent window is selected from the group comprising quartz, sapphire, PYREX™ and any combination thereof.

10. The apparatus of claim 1, wherein the radiation transparent window comprises a material substantially transparent to infrared radiation.

11. The apparatus of claim 1, wherein second vacuum chamber comprises a chamber body and a lid disposed thereon and wherein the port is formed in the lid.

12. An apparatus for measuring the temperature of an object before and/or after processing, comprising:
  (a) a first vacuum chamber comprising a radiation transparent window disposed in a port formed in the first vacuum chamber;
  (b) a second vacuum chamber mounted to the first vacuum chamber, wherein the first and second vacuum chambers comprise an aperture for transfer of the object therethrough and wherein the aperture defines a transfer plane;
  (c) a first probe disposed in the port and defining a first optical path into the first vacuum chamber and incident on the transfer plane; and
  (d) a signal processing unit coupled to the first probe.

13. The apparatus of claim 12, wherein the signal processing unit comprises:
  (i) a signal detector coupled to the probe to convert the optical signal into an electrical signal; and
  (ii) a microprocessor coupled to the signal converter.

14. The apparatus of claim 12, wherein the first probe is a pyrometer.

15. The apparatus of claim 12, further comprising a robot disposed in the first vacuum chamber, wherein the robot comprises a movable blade for supporting the object and positioning the object in the first optical path.

16. The apparatus of claim 12, further comprising a second probe coupled to the signal processing unit and defining a second optical path incident on the transfer plane.

17. The apparatus of claim 16, wherein the first optical path intercepts the object in at least a first direction and the second optical path intercepts the object in at least a second direction.

18. The apparatus of claim 12, wherein the first vacuum chamber comprises a chamber body and a lid disposed thereon and wherein the port is formed in the lid.

19. An apparatus for measuring the temperature of an object, comprising:
  (a) a first vacuum chamber comprising at least one radiation transparent window disposed in at least one opening formed in a first vacuum chamber wall;
  (b) a robot disposed in the first vacuum chamber comprising a robot blade defining a transfer plane;
  (c) a second vacuum chamber mounted to the first vacuum chamber, wherein the first vacuum chamber and the second vacuum chamber communicate through an aperture for transfer of the object therethrough;
  (d) at least one pyrometer disposed in the at least one opening and defining at least one optical path into the first vacuum chamber and incident on the transfer plane; and
  (e) a signal processing unit coupled to the at least one pyrometer.

20. The apparatus of claim 19, wherein the robot blade is positionable in the at least one optical path.

21. The apparatus of claim 19 wherein the first vacuum chamber wall is a lid disposed on a chamber body of the first vacuum chamber.

22. A method for measuring the temperature of a radiant object entering and/or exiting a vacuum chamber, comprising:
  (a) moving the radiant object into an optical path of a probe disposed externally to the vacuum chamber;
  (b) measuring a first temperature of the radiant object;
  (c) recording an elapsed time period from a processing end-point to (b) and, subsequent to (b), extrapolating the first temperature of the radiant object to a second temperature.

23. The method of claim 22, wherein (b) comprises:
  (i) receiving a propagating wave from the radiant object at the probe;
  (ii) converting the propagating wave to an electrical signal; and
  (iii) converting the electrical signal into the first temperature of the radiant object.

24. The method of claim 22, wherein (a) and (b) are performed simultaneously.

25. The method of claim 22, wherein the second temperature corresponds to an object temperature at a time subsequent or equal to the processing end-point and prior to the first temperature.

26. The method of claim 22, further comprising correlating the first temperature of the radiant object to a second temperature.

27. The method of claim 22, wherein the second temperature corresponds to an object temperature at a time subsequent or equal to the processing end-point and prior to the first temperature.

* * * * *

UNITED STATES PATENT AND TRADEMARK OFFICE
CERTIFICATE OF CORRECTION

PATENT NO. : 6,190,037 B1 Page 1 of 1
DATED : February 20, 2001
INVENTOR(S) : Das et al.

Figure 8:
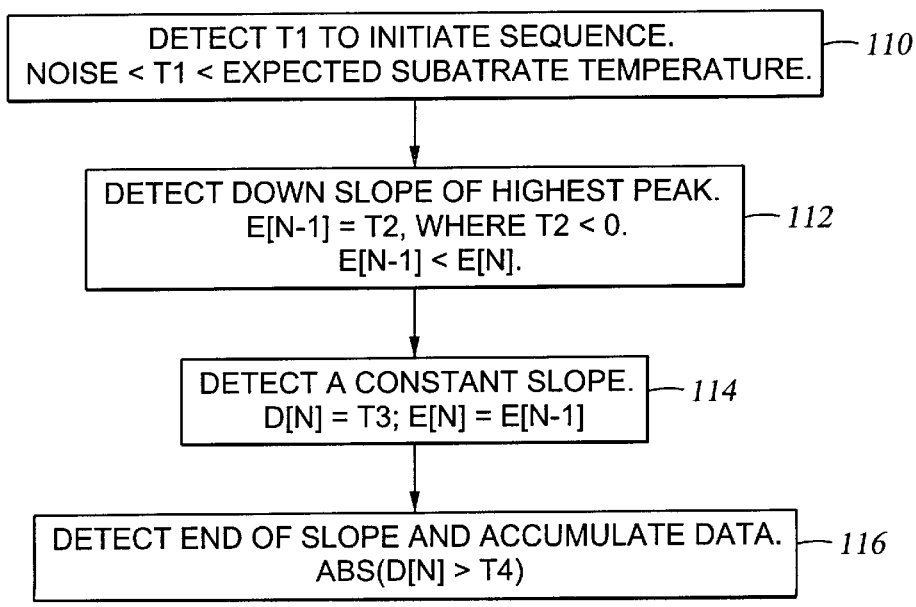
FIG. 8 is a flow chart of an algorithm.

It is certified that error appears in the above-identified patent and that said Letters Patent is hereby corrected as shown below:

Drawings,
Figure 8, Box 110, line 2, please replace "SUBATRATE" with -- SUBSTRATE --.

Column 7,
Line 35, please replace "1 0 $\mu\lambda$for" with -- 10.0$\mu\lambda$ for --.

Column 11,
Line 33, please start a new paragraph after "E[n]."

Signed and Sealed this

Thirteenth Day of August, 2002

Attest:

JAMES E. ROGAN
Attesting Officer        Director of the United States Patent and Trademark Office